(No Model.) 2 Sheets—Sheet 1.
A. HAARLANDER.
FLUSHING TANK FOR WATER CLOSETS.
No. 396,927. Patented Jan. 29, 1889.
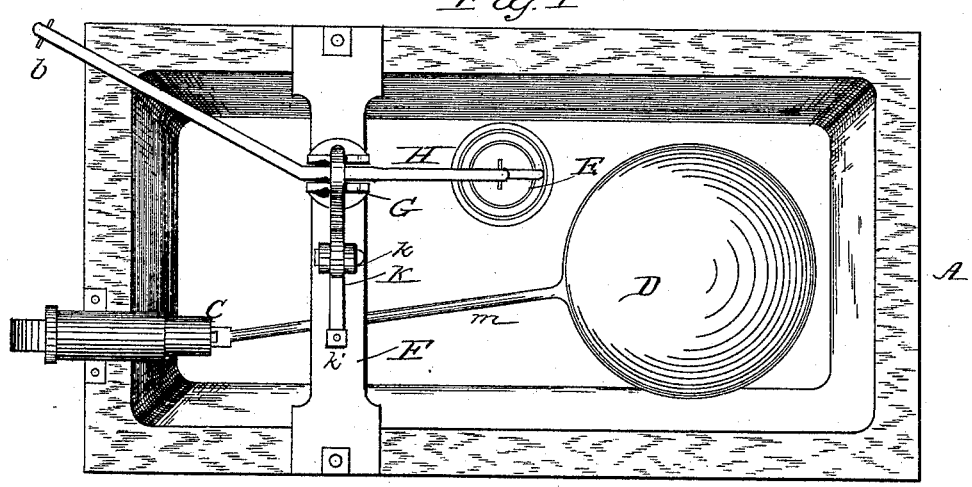

(No Model.) 2 Sheets—Sheet 2.
A. HAARLANDER.
FLUSHING TANK FOR WATER CLOSETS.
No. 396,927. Patented Jan. 29, 1889.
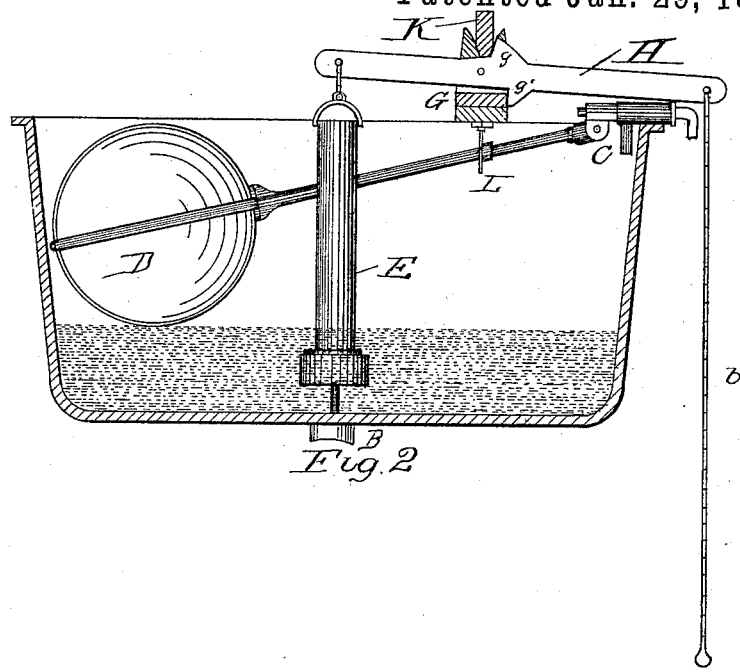
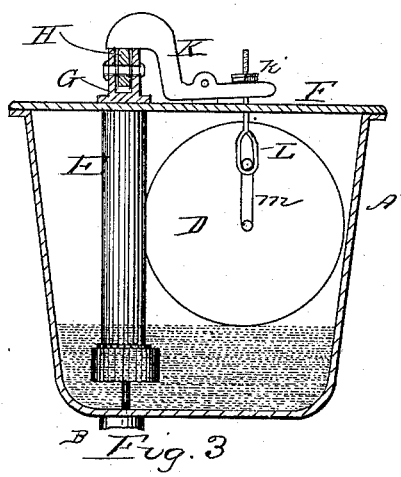
WITNESSES:
INVENTOR,
August Haarlander
ATTORNEYS.

UNITED STATES PATENT OFFICE.

AUGUST HAARLANDER, OF ALLEGHENY, PENNSYLVANIA.

FLUSHING-TANK FOR WATER-CLOSETS.

SPECIFICATION forming part of Letters Patent No. 396,927, dated January 29, 1889.

Application filed August 8, 1887. Serial No. 246,418. (No model.)

*To all whom it may concern:*

Be it known that I, AUGUST HAARLANDER, a citizen of the United States, residing at Allegheny, in the county of Allegheny and State of Pennsylvania, have invented certain new and useful Improvements in Flushing-Tanks; and I do hereby declare the following to be a full, clear, and exact description of the invention, reference being had to the accompanying drawings, which form part of this specification.

This invention has relation to flushing-tanks for water-closets, and has for its object the provision of means for controlling or regulating the flow of water from the tank and automatically closing the eduction-valve when sufficient water has escaped to flush the closet-basin.

My invention accordingly consists in the novel construction and combination of devices, whereby, when the pull-chain is drawn and the eduction-valve open, the latter will remain open until a given quantity of water has escaped, and will be closed automatically by mechanism tripped by the weight of the descending float.

The mechanism embodying my invention comprises the usual float connected to the inlet-valve and a pair of interlocking levers, one of which is connected to the pull-chain at one end and to the eduction-valve at the other, while the other lever carries an adjustable stirrup or hook, with which the stem of the float engages as it descends. The levers are so constructed and related that when the chain is pulled and the eduction-valve raised both levers will become interlocked, and will maintain the educt open till the float descends and disconnects them.

In the accompanying drawings, Figure 1 is a plan view of a flushing-tank provided with my improvements. Fig. 2 is a vertical longitudinal section, and Fig. 3 is a vertical transverse section, of the same.

A designates the tank or cistern of the usual form and having the eduction pipe or outlet B and the inlet-valve C. The latter is connected to the stem of the float D, and is closed and opened, as is common, by the rising and falling of the float.

E is the eduction-valve, which, for convenience and utility, I make high and tubular, so as to serve as an overflow-conduit.

F designates a transverse bar resting on and secured to the walls of the tank. Upon this bar is fastened a forked standard, G, between the sides of which is pivoted the lever H, having attached to one end the pull-chain $b$ and to the other the eduction-valve E. At their upper ends the sides of the standard G are notched, so as to form convergent recesses for the reception of the head of the trigger-lever K. The latter is pivoted to block $k$, attached to the cross-bar F, and is of an approximately Z shape, so that its upper part or head will lie in the notches of the standard G. The lever H is formed with two projections or shoulders, $g\ g'$, which, when the lever is in a horizontal position, lie the former with its face flush with the outer surface of the head of the lever K, while the other abuts against the base of the standards G and operates as a stop to limit the movement of the lever H.

L designates a loop or stirrup having a threaded shank or stem, which passes upwardly from below the bar F and through the same and rear end of lever K, being adjustably secured to the latter by a pair of jam-nuts, $k'$, above said lever. The stem $m$ of the float passes through the stirrup, as shown.

The operation is as follows: When the tank is full and the eduction-port closed, the lever H is slightly tilted downward toward the eduction-valve. The head of the lever K then rests on the top of the shoulder $g$, while the float lies on the surface of the water. The chain to lift the eduction-valve being now pulled, the lever H is tilted back, so as to let the head of the lever K fall behind the shoulder. The lever remains interlocked, with the eduction-valve opened, and as the water escapes the float descends until its stem comes in contact with the stirrup L, whereupon it draws down the rear end of the trigger-lever K, disengages it from lever H, and allowing the eduction-valve to close.

By properly adjusting the stirrup by means of the nuts the period of action of the float-stem may be regulated, so as to cause a closing of the eduction-valve after the escape of any given or limited quantity of water.

The invention described possesses many advantages, among which may be mentioned its simplicity, certainty of action, automatic operation in flushing the closet-basin and in closing the eduction-valve, and its capacity of regulation or adjustment. As will be seen, the flow of sufficiency of water is insured upon the pulling of the chain, whether the latter be held or released, while the tank may be adapted to conditions when the limited supply of water requires economy and the prevention as far as possible of unnecessary waste.

Having described my invention, I claim and desire to secure by Letters Patent—

1. In a flushing-tank for water-closets, the combination, with the induction-valve C and eduction-valve E, of the float D, stirrup L, trigger-lever K, connected to said stirrup, and lever H, connected to the eduction-valve, and chain $b$, said levers being arranged at right angles to each other and interlocking, substantially as described.

2. The combination, with a flushing-cistern, of induction-valve C, lever $m$, and float D, for operating the induction-valve, eduction-valve E, and pivoted lever H, for operating it, having shoulder $g$, and pivoted trigger K, arranged to engage said shoulders, and stirrup connecting said trigger to lever $m$, all combined and arranged substantially as shown and described.

In testimony that I claim the foregoing I have hereunto set my hand this 27th day of July, 1887.

AUGUST HAARLANDER.

Witnesses:
LOUIS MOESER,
IG. STAUFFER.